United States Patent
Huck et al.

(10) Patent No.: US 8,733,287 B2
(45) Date of Patent: May 27, 2014

(54) LITTER BOX ASSEMBLY HAVING A LITTER FRAGMENTING DEVICE

(75) Inventors: Nathan Foster Huck, Jackson, MO (US); Dan Kenneth Dixon, St. Louis, MO (US); Michael Edward Leiweke, Hillsboro, MO (US); Stephen Andrew Wurth, St. Louis, MO (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/700,611

(22) PCT Filed: Mar. 29, 2011

(86) PCT No.: PCT/US2011/000572
§ 371 (c)(1),
(2), (4) Date: Jan. 9, 2013

(87) PCT Pub. No.: WO2011/155967
PCT Pub. Date: Dec. 15, 2011

(65) Prior Publication Data
US 2013/0206075 A1  Aug. 15, 2013

Related U.S. Application Data

(60) Provisional application No. 61/397,541, filed on Jun. 11, 2010.

(51) Int. Cl.
*A01K 29/00* (2006.01)
*A01K 1/01* (2006.01)

(52) U.S. Cl.
USPC ......................................... 119/165; 119/166

(58) Field of Classification Search
USPC ......... 119/165, 166, 167, 168, 161, 171, 172, 119/173; 241/220, 222, 224, 225, 227, 241
See application file for complete search history.

(56) References Cited

U.S. PATENT DOCUMENTS

| | | | | | |
|---|---|---|---|---|---|
| 768,531 | A | * | 8/1904 | Kirby | 241/224 |
| 2,925,226 | A | * | 2/1960 | Pratique | 241/225 |
| 3,199,798 | A | * | 8/1965 | Turner, Jr. | 241/242 |
| 3,482,790 | A | * | 12/1969 | Boster | 241/259.1 |
| 3,744,729 | A | * | 7/1973 | Ackerman | 241/239 |
| 3,923,005 | A | | 12/1975 | Fry et al. | |
| 3,954,086 | A | | 5/1976 | Maness | |
| 3,983,842 | A | * | 10/1976 | Marion et al. | 119/171 |
| 4,206,718 | A | | 6/1980 | Brewer | |

(Continued)

FOREIGN PATENT DOCUMENTS

WO  2009133212 A1  11/2009

OTHER PUBLICATIONS

International Search Report for PCT/US2011/000572 dated Jun. 22, 2011.

*Primary Examiner* — Yvonne Abbott
(74) *Attorney, Agent, or Firm* — Julie M. Lappin; Benjamin J. Sodey

(57) ABSTRACT

The invention provides litter box assemblies useful for managing animal waste. In a general aspect, the litter box assembly includes an animal litter box, a litter fragmenting device attached to the litter box, and an optional hopper attached to the litter fragmenting device. The hopper can store an animal litter that has improved absorption capabilities after being fragmented by the litter fragmenting device. The invention also provides kits useful for making the litter box assemblies and using such litter box assemblies for managing animal waste.

14 Claims, 2 Drawing Sheets

(56) References Cited

U.S. PATENT DOCUMENTS

| | | | |
|---|---|---|---|
| 4,217,858 A * | 8/1980 | Dantoni | 119/171 |
| 4,873,811 A * | 10/1989 | Izumitani et al. | 53/139.1 |
| 4,881,490 A | 11/1989 | Ducharme et al. | |
| 4,929,474 A | 5/1990 | Avni et al. | |
| 4,949,672 A | 8/1990 | Ratcliff et al. | |
| 5,035,205 A | 7/1991 | Schiller et al. | |
| 5,085,175 A * | 2/1992 | Clements et al. | 119/171 |
| 5,293,837 A | 3/1994 | Caldwell | |
| 5,325,815 A * | 7/1994 | Gumpesberger | 119/166 |
| 5,427,321 A * | 6/1995 | Takahashi et al. | 241/73 |
| 5,690,052 A * | 11/1997 | Sladek | 119/171 |
| 5,806,462 A | 9/1998 | Parr | |
| 5,860,391 A | 1/1999 | Maxwell et al. | |
| 5,901,661 A | 5/1999 | Pattengill et al. | |
| 6,014,947 A * | 1/2000 | Sladek et al. | 119/171 |
| 6,095,088 A | 8/2000 | Savicki | |
| 6,206,947 B1 * | 3/2001 | Evans et al. | 71/63 |
| 6,276,300 B1 | 8/2001 | Lewis, II et al. | |
| 6,287,550 B1 | 9/2001 | Trinh et al. | |
| 6,513,453 B1 * | 2/2003 | Johnson | 119/212 |
| 6,524,603 B1 | 2/2003 | Smith et al. | |
| 6,543,385 B2 | 4/2003 | Raymond et al. | |
| 6,578,521 B2 | 6/2003 | Raymond et al. | |
| 6,837,181 B2 | 1/2005 | Schulein, Jr. et al. | |
| 6,860,234 B2 | 3/2005 | Raymond et al. | |
| 6,887,570 B2 | 5/2005 | Greene et al. | |
| 6,955,136 B2 | 10/2005 | Schulein, Jr. | |
| 6,962,129 B1 | 11/2005 | Lawson | |
| 7,228,819 B1 | 6/2007 | Wang et al. | |
| 7,290,499 B2 | 11/2007 | Emery | |
| 7,316,201 B2 | 1/2008 | Rasner et al. | |
| 7,331,309 B2 | 2/2008 | Burckbuchler, Jr. | |
| 7,426,902 B1 * | 9/2008 | Doering et al. | 119/171 |
| 7,429,421 B2 | 9/2008 | Greene et al. | |
| 7,523,973 B2 | 4/2009 | Lin et al. | |
| 7,527,019 B2 * | 5/2009 | Burckbuchler, Jr. | 119/171 |
| 7,533,630 B2 | 5/2009 | Steckel et al. | |
| 7,603,964 B2 | 10/2009 | Jenkins et al. | |
| 7,628,118 B1 | 12/2009 | Nottingham et al. | |
| 7,757,638 B2 | 7/2010 | Wang et al. | |
| 7,895,976 B2 | 3/2011 | Ikegami et al. | |
| 8,062,405 B1 * | 11/2011 | Reiter et al. | 71/21 |
| 8,074,604 B2 | 12/2011 | Swank | |
| 8,555,818 B2 * | 10/2013 | Gordon et al. | 119/166 |
| 2004/0163604 A1 | 8/2004 | Kirk et al. | |
| 2005/0005869 A1 | 1/2005 | Fritter et al. | |
| 2005/0132968 A1 | 6/2005 | Swank | |
| 2006/0196438 A1 | 9/2006 | Caputa et al. | |
| 2007/0277740 A1 | 12/2007 | Delman et al. | |
| 2008/0087226 A1 | 4/2008 | Steckel et al. | |
| 2008/0223302 A1 | 9/2008 | Wang et al. | |
| 2009/0000560 A1 | 1/2009 | Matsuo et al. | |
| 2009/0000562 A1 | 1/2009 | Jenkins et al. | |
| 2009/0250014 A1 | 10/2009 | Juan | |
| 2009/0272327 A1 | 11/2009 | Plante | |
| 2012/0012064 A1 | 1/2012 | Jenkins et al. | |

* cited by examiner

LITTER BOX ASSEMBLY HAVING A LITTER FRAGMENTING DEVICE

CROSS REFERENCE TO RELATED APPLICATIONS

This application is a national stage application under 35 USC §371 of PCT/US2011/000572, filed on 29 Mar. 2011 and claims priority to U.S. Provisional Application Number 61397541 filed on 11 Jun. 2010, the disclosures of which are incorporated herein by this reference.

BACKGROUND OF THE INVENTION

1. Field of the Invention

The invention relates generally to litter box assemblies and particularly to litter box assemblies having a litter fragmenting device.

2. Description of Related Art

Numerous animal litter boxes and animal litter box assemblies are known in the art, e.g., U.S. Pat. No. 6,095,088 entitled "Pet Litter Box Assembly", U.S. Pat. No. 7,290,499 entitled "Self-cleaning Pet Litter Box Assembly", and U.S. Pat. No. 5,293,837 entitled "Litter Box Having Shelf Formed in Side Wall Thereof Supporting Fine and Coarse Grid Assembly." These and other known litter boxes and animal litter box assemblies function for their intended purpose but none of the known litter boxes and animal litter box assemblies have an integral litter fragmenting device that permits a user to make fragmented litter at the point of use or to make animal litter with improved properties.

Animal waste management products such as animal litter are commonly used to collect and process animal waste, e.g., the waste of a pet such as a cat. The litter is poured into a litter box or tray and collects the animal's waste products. However, conventional litter boxes and animal litter contained in the litter box can be problematic for the user. For example, the animal litter may not be suitable for absorbing large amounts of urine. In addition, the animal litter may not typically absorb any substantial portion of the obnoxious odors produced by animal excrement. These odors caused by excessive waste can escape into the surrounding area and become an annoyance to the user and others. Additionally, the aggregate size of the litter used in the box may not be appealing to the pet. Cats in general for example prefer smaller aggregate pieces as elimination substrates.

Animal litter comprises particulates that can be scattered when poured into the litter box. The used litter can be dusty and have a high bulk density leading to difficult cleaning once the litter needs to be changed. Consequently, to keep the litter boxes in a sanitary condition and minimize obnoxious odors emanating therefrom, the absorbent litter must be changed regularly. This involves periodically disposing of soiled litter and replacing it with unsoiled litter, which involves unpleasantly close contact with litter soiled by animal wastes.

Animal litters having superior or improved absorption capacity can decrease the frequency of cleanings while still absorbing large amounts of animal waste, e.g., urine. However, these animal litters are usually more costly. An alternative is to provide a litter box that can modify and improve the absorption capacity of animal litter at the point of use, e.g., a pet owner's home. Additionally, this size modification can enhance the pet appeal for the litter substrate. There is, therefore, a need for litter box assemblies capable of producing animal litter at the point of use, particularly animal litters having improved properties such as absorption capabilities and pet appeal.

SUMMARY OF THE INVENTION

It is, therefore, an object of the invention to provide litter box assemblies capable of producing animal litters having improved properties such as absorption capabilities.

It is another object of the invention to provide litter box assemblies capable of producing fragmented animal litter at the point of use.

It another object of the invention to provide litter box assemblies capable of fragmenting animal litters, particularly extruded animal litters that have an increased absorption rate when fragmented.

It is a further object of the invention to provide kits useful for producing litter box assemblies that accomplish the above-mentioned objects of the invention.

These and other objects are achieved using litter box assemblies comprising a litter box and a litter fragmenting device attached to the litter box. In preferred embodiments, the litter fragmenting device fragments extruded animal litter particles to expose the interior of the particles to the external environment. The interior portion of these fragmented extruded litter particles has the ability to absorb liquids such as animal urine or the moisture from animal feces or other wastes at an increased rate compared to the surface portion of the particles. In various embodiments, the litter box assemblies further comprise one or more of a hopper capable of feeding animal litters into the litter fragmenting device and an animal litter contained in the hopper.

Additional and further objects, features, and advantages of the invention will be readily apparent to those skilled in the art.

DETAILED DESCRIPTION OF THE INVENTION

Definitions

Figure 1:
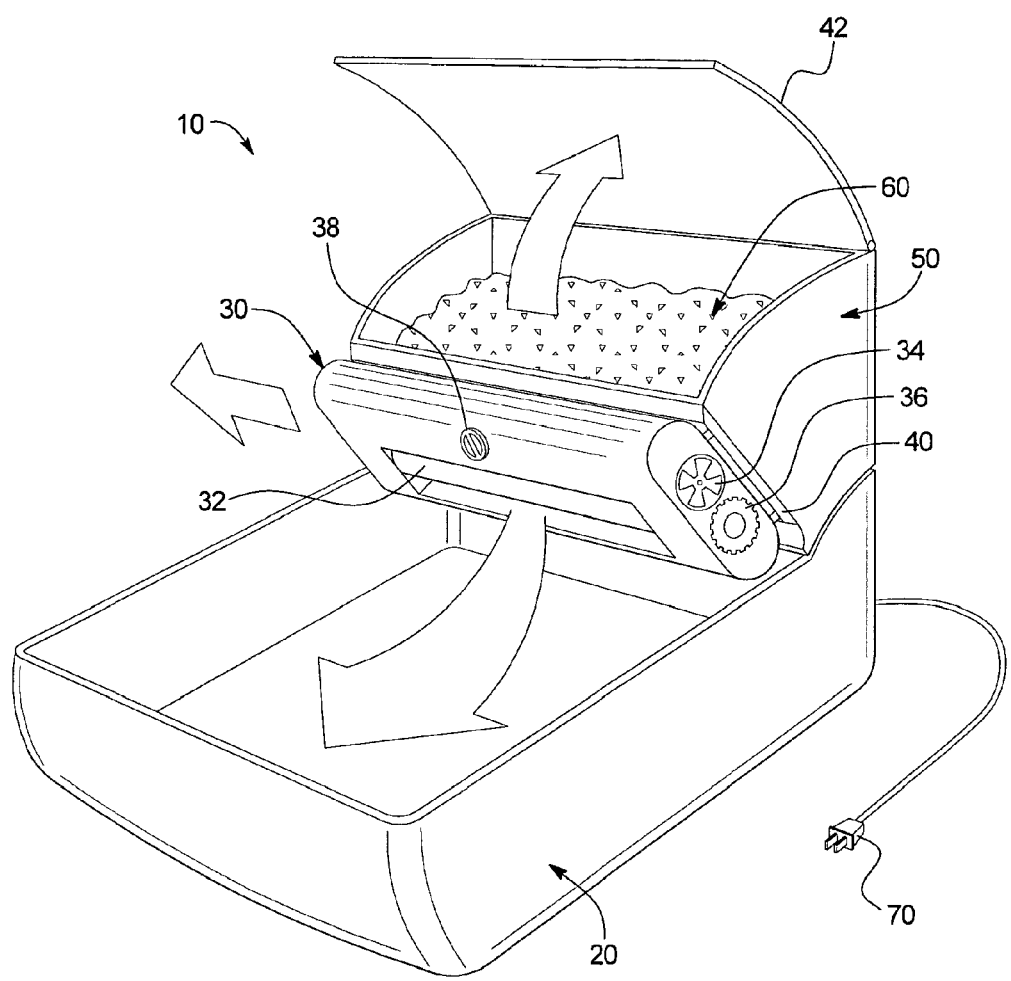
FIG. 1 shows a front perspective view of an animal litter box assembly in an embodiment of the invention.

The term "animal litter(s)" means a composition that is suitable for use as an animal litter (e.g., managing animal waste) but that can also be used for any other suitable purpose. For example, an animal litter described herein could be used to absorb a chemical spill, absorb an oil spill, create traction on a slippery surface, and the like.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may contain a litter box, a litter fragmenting device, a hopper, a litter, and the like as described herein that are physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

All percentages expressed herein relating to the components of a composition are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a litter box" or "a method" includes a plurality of such "litter boxes" or "methods". Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The devices, assemblies, kits, methods, compositions, and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

The Invention

Figure 2:
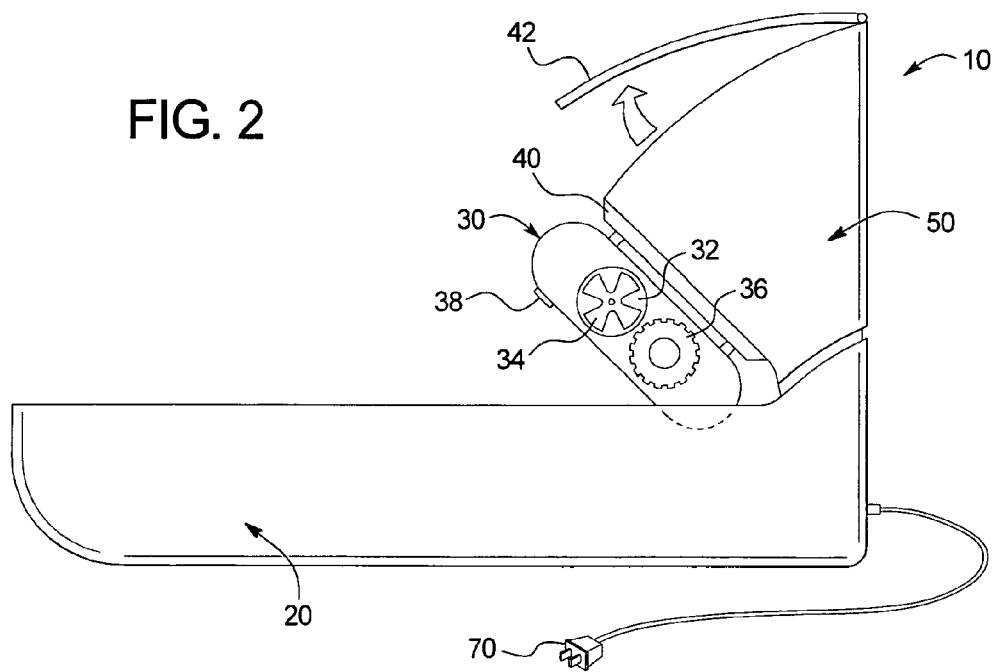
FIG. 2 shows a right side view of the animal litter box assembly of FIG. 1.
Figure 3:
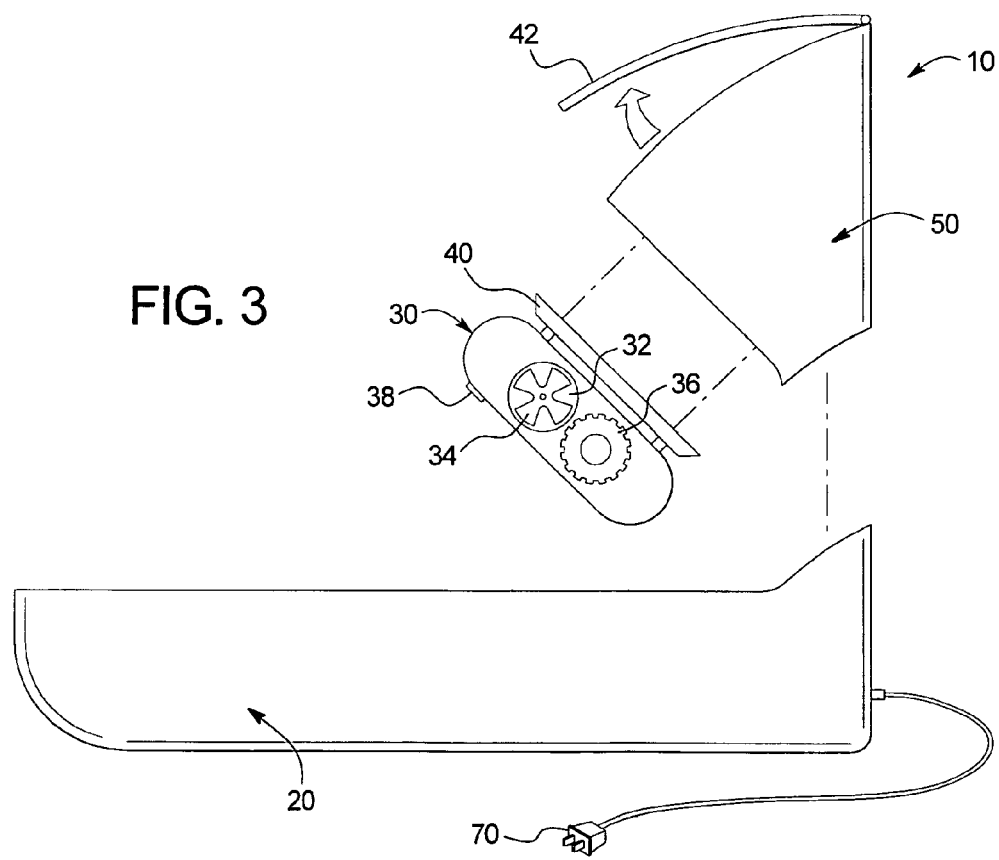
FIG. 3 shows an exploded right side view of the animal litter box assembly of FIG. 1.

In one aspect, illustrated in FIGS. 1-3, the invention provides a litter box assembly 10 including a litter box 20 and a litter fragmenting device 30 attached to litter box 20. The litter fragmenting device is attached to the litter box such that a litter can be fed into the litter fragmenting device, fragmented by the litter fragmenting device, and placed into the litter box as the fragmented litter exits the litter fragmenting device. The litter fragmenting assembly is useful for adjusting the size of litter particles to accommodate a particular need or for fragmenting extruded litter to increase its absorption rate as described in U.S. Provisional Patent Application Ser. No. 61/339,262, filed on Mar. 2, 2010.

Litter fragmenting device 30 can be fixed or releasably attachable to litter box 20. Litter fragmenting device 30 can be attached to litter box 20 using any suitable attachment mechanism such as, for example, snap together connections, clamps screws, bolts, adhesive, and the like. In one embodiment, the litter box and the fragmenting device are custom manufactured such that the litter box and fragmenting device contain matching fastening mechanisms that make it easy to assemble the litter box and the fragmenting device to produce the litter box assembly and to disassemble the litter box assembly to facilitate cleaning, transportation, and the like. Such mechanisms are designed to ensure that litter can be easily fed into the litter fragmenting device and that the assembly will feed fragmented litter directly into the litter box.

In one embodiment, litter fragmenting device 30 includes a feeding chute 40 sized to allow litter fragmenting device 30 to receive any suitable size or useful amount of an animal litter and feed the litter into and through the fragmenting device.

In a further embodiment, the feeding chute 40 is sized and configured to integrally connect to a corresponding container of animal litter, preferably a package containing extruded animal litter as described herein. A container of animal litter is manufactured so that it reversibly connects to the feeding chute and contains a predefined amount of animal litter, typically an amount suitable for one use of the litter box. The container is opened and connected to the feeding chute. The fragmenting device is activated, e.g., by hand or by a sensor in the litter box assembly that detects the presence of the container. The predefined amount of animal litter is fragmented and placed in the litter box. The container is disengaged from the feeding chute, where it can be discarded or reused by refilling in the container.

The containers can have any shape and size, as long as they are capable of integrally connecting to the feeding chute on the fragmenting device. The containers can be sized to contain an amount of animal litter need for the animal based on its type and size, e.g., a small dog or a large cat, or sized to accommodate multiple animals used of the litter box assembly. In one embodiment, the container is cylindrical, having a diameter of from about 2 to about 8 inches and a height of from about 4 to about 24 inches. In various embodiments, the feeding chute and the container are connected using a fitting or coupling mechanisms or mechanical joint mechanisms, e.g., plug and a socket connection; positive-holding mechanical assembly such as flanged joint, screwed joint, flared joint; and the like. Many such connections are known to skilled artisans.

In another embodiment, litter fragmenting device 30 is constructed and arranged to incorporate a hopper 50 attached to litter fragmenting device 30. Hopper 50 can be attached to litter fragmenting device 30 using any suitable attachment mechanism such as, for example, snap together connections, clamps screws, bolts, adhesive, and the like. In addition, hopper 50 can be detachable from litter fragmenting device 30. Hopper 50 can define an opening that corresponds to feeding chute 40 of litter fragmenting device 30. Litter fragmenting device 30 and hopper 50 can be positioned at any suitable location of litter box 20. In one embodiment, the fragmenting device and the hopper are custom manufactured such that the fragmenting device and hopper contain matching fastening mechanisms that make it easy to connect and disconnect the fragmenting device and the hopper.

In an embodiment wherein the litter fragmenting device is operated by electricity, the feeding chute has a kill switch that is engaged when the hopper is attached to the litter fragmenting device and the hopper has an activator that engages and activates the kill switch when the hopper is attached to the litter fragmenting device. The kill switch is in electrical communication with the electrical switch or other mechanism that activates operation of the litter fragmenting device such that the litter fragmenting device will not operate unless the hopper has been attached to the litter fragmenting device and the kill switch has been engaged by the activator. This embodiment helps control the operation of the litter fragmenting assembly and ensures safety of the operator. In other embodiments, a kill switch is connected to the hopper lid such that the litter fragmenting device will not operate unless the hopper lid is closed. In a preferred embodiment, the kill switch is connected to the hopper lid and the hopper such that the hopper must be attached to the litter fragmenting device and the hopper must be closed or the litter fragmenting device will not operate.

Litter box 20 can be specifically constructed and arranged for the storage and use of any type of animal litter. Litter box 20 can also include for improved functionality various elements such as one or more sensors, transmitters, vents, fans, automatic scoops, hoods, covers, fragrance emitting elements, odor control elements (pads of activated carbon attached to or embedded in the litter box), and the like. Litter box 20 can be sized to hold a sufficient amount of animal litter for a specified use as well as be designed for easy access by an animal, e.g., based on the size of the animal or frequency of use by one or more animals.

As shown in FIGS. 1-3, litter fragmenting device 30 can include one or more rollers 32 and 36. Rollers 32 and 36 can have a cylindrical or other shape and be spaced apart from each other at any suitable distance. During operation, rollers 32 and 36 rotate in a manner that allows animal litter 60 to pass between them. Typically, the rollers in the fragmenting device are adjusted such that the distance between rollers 32 and 36 will be smaller than the size of individual pieces, pellets, or particles of animal litter 60. As the litter particles pass between rollers 32 and 36, the particles are fragmented. The rollers can have pins, teeth, groves, or other devices or configurations that facilitate litter fragmentation.

With litter fragmenting device 30, a user can adjust the fragmented animal litter particle size 60 to suit the needs of the animals, e.g., reduce tracking, prevent or reduce occurrence of litter particles adhering to the animal's foot, fecal size, animal waste quantity, and the like. Rollers 32 and 36 can be spaced closer together to obtain smaller fragmented animal litter particles 60. Rollers 32 and 36 can be spaced further apart to obtain larger fragmented animal litter particles 60. As seen in FIGS. 1-3, roller 36 has a corrugated surface in one embodiment. In alternative embodiments, rollers 32 and 36 can both have corrugated or smooth surfaces. Litter fragmenting device 30 can be adjustable so that the fragmented animal litter particle sizes 60 can be controlled and the speed of rollers 32 and 36 can be adjusted.

Litter fragmenting device 30 can further include a fragment adjuster 38 to manually or automatically control the animal litter particle size 60 produced by the litter fragmenting device 30. Fragment adjuster 38 can be a small electrical device in litter fragmenting device 30 that increases or decreases the gap between rollers 32 and 36. In this example, the size of the fragmented particles can be determined by fragment adjuster 38. The gap between rollers 32 and 36 is indicated by the position of fragment adjuster 38. This control can be calibrated so that at the largest number rollers 32 and 36 are moved farthest outward and hence the gap between them is at its largest. Similarly, at the smallest number, rollers 32 and 36 are moved inwards toward each other resulting in the smallest gap between them. The points in between are scaled accordingly. Shearing and breaking of animal litter particles 60 can be accomplished as they are fed from hopper 50 through litter fragmenting device 30.

In an embodiment, litter fragmenting device 30 is manually operable. As shown in FIGS. 1-3, one of the rollers (e.g., roller 32) can include a grip 34 that allows a user to rotate that specific roller by hand. Manual rolling of one of the rollers will cause animal litter 60 to pass between rollers 32 and 36 and be fragmented accordingly. Any suitable type of handle or similar device can be used to rotate the roller.

In an alternative embodiment, litter fragmenting device 30 can be automated. In this configuration, litter fragmenting device 30 can include a motor (not shown) connected to a suitable power source, for example, via a power cord 70. Suitable power sources can include a battery, electricity (e.g., via a power plug), solar energy, or any other suitable energy source. For large scale uses, e.g., a large animal kennel, the motor could be a gasoline motor. In preferred embodiments, the motor or other power source for operating the litter fragmenting device is controlled by a switch, preferably an on/off switch although the switch can have multiple settings.

In other embodiments, litter fragmenting device 30 includes one or more of any suitable fragmenters, e.g., alone or in combination with rollers. The fragmenters can be in the form of blades, hammers, teeth, gears, mills, grinders, and the like that can fragment the individual pieces of animal litter 60 into any desirable size. Using litter fragmenting device 30, individual pieces or particles of animal litter (e.g., extruded animal litter) can be fragmented into two particles. In other embodiments, the animal litter particles are fragmented into more than two particles. In various embodiments, animal litter particles produced by fragmentation are further fragmented to produce more animal litter particles.

In one embodiment, litter fragmenting device 30 includes a timer (not shown) that can be set to fragment animal litter 60 periodically without an operator. In another, the fragmenting device includes a sensor that operates the fragmenting device when receiving a signal from a transmitter, e.g., a remote control, a telephone ringer, a transmitter connected to the internet, a transmitter activated by telephone, and the like. The litter fragmenting device can also include a transmitter to communicate with external devices, e.g., send information to a receiver indicating that the litter amount in the litter box is lower than desirable. In a further, a sensor operates the fragmenting device after a use of the litter box by an animal, e.g., the sensor senses the presence of the animal or the presence of a transmitter implanted in the animal or an article associated with the animal, e.g., a collar, harness, or piece of clothing worn by the animal.

In still another embodiment, the fragmenting device contains or is in communication with a microprocessor that is programmable such that the fragmenting device will operate when instructed to by a program included in the microprocessor. In a preferred embodiment, the litter box assembly is connected to a computer that contains a microprocessor and a program that operates the litter box assembly according to a schedule consistent with the program. The computer can be connected to the litter box assembly using typical wired connections or can operate the litter box assembly via sensors and wireless transmitted signals.

As seen in FIGS. 1-3, hopper 50 can include a lid 42 to enclose animal litter 60, e.g., to keep it fresh or protect it from the environment. Lid 42 can form a hermetic seal with hopper 50 to keep animal litter 60 fresh for extended periods. Hopper 50 can have any suitable shape for facilitating the movement of animal litter 60 through feeding chute 40 to litter fragmenting device 30. In an embodiment, hopper 50 is suitably sized so as to be large enough to store litter so it only has to refilled periodically, e.g., daily, weekly, or monthly.

As seen in FIGS. 1-3, a preferred embodiment of the litter box assembly 10 comprises a litter box 20; a litter fragmenting device 30 attached to litter box 20, wherein the litter fragmenting device has a feeding chute 40; and hopper 50 that can be attached to the litter fragmenting device 30 such that litter 60 will enter the litter fragmenting device 30 as needed to fragment animal litter 60. In an additional embodiment, the litter box assembly further comprises animal litter 60. Preferably, the animal litter 60 is an extruded animal litter as described in U.S. Provisional Patent Application Ser. Nos. 61/337,019, filed on Jan. 29, 2010.

In one embodiment, litter box 20 is specifically constructed to have tracks, groves, or similar devices along one or more edges of the litter box. Concurrently, the litter fragmenting device is constructed to have wheels, gears, or similar devices that engage the tracks, groves, or similar devices such that the litter fragmenting device can move across the length or width of the litter box. The wheels, gears, or similar devices are powered by hand, electrical motor, spring(s), or similar devices. Using this embodiment, the litter is placed in the feeding chute or hopper, the litter fragmenting device is placed at one edge of the litter box, the fragmenting device, e.g., the fragmenting mechanism (rollers 32 and 36) and the wheels, gears, or similar devices are activated. The fragmenting device is activated and moves across the length or width of the litter box while depositing fragmented litter into the litter box. The litter fragmenting device stops at the opposite edge of the litter box from where it started, e.g., controlled by a timer, a switch on the litter box and/or the litter fragmenting device, or exhaustion of the litter supply in the feeding chute or hopper. This embodiment ensures that the fragmented litter will be evenly distributed throughout the litter box. This embodiment is useful to help minimize dust associated with dispersing the litter and ensures a relatively uniform distribution of the litter in the litter box. It is also useful when activated by timers or remotely so that the operator does not have to be present to spread the litter after it is fragmented, typically by hand using a rake or similar device.

In another aspect, the invention provides kits useful for producing and using the litter box assemblies of the invention. The kits comprise in separate containers in a single package or in separate containers in a virtual package, as appropriate for the kit component, either (A) a litter box and a litter fragmenting device that can be attached to the litter box as described herein, and optionally; or (B) least one of a litter box and a litter fragmenting device that can be attached to the litter box as described herein; and at least one of (1) a hopper that can be attached to the litter fragmenting device such that it feeds animal litter into the fragmenting device; (2) one or more animal litters, preferably extruded animal litters as contemplated herein; (3) instructions sufficient to produce a litter box assembly using the litter box and the litter fragmenting device; (4) instructions sufficient to produce a litter box assembly using the litter box, the litter fragmenting device, and a hopper; (5) instructions on how to use a litter box assembly produced using the litter box and the litter fragmenting device to fragment litter particles; (6) instructions on how to obtain technical assistance to produce or use the litter box assembly, e.g., a pamphlet, a booklet, an internet reference, a telephone number where recorded instructions are available, and the like; (7) a litter handling device useful for feeding litter into the feeding chute or hopper or for managing the fragmented litter, e.g., a scoop, cup, rake, comb, and the like; (8) an animal waste handling device useful for handling animal waste, e.g., a spoon, scoop, rake, and the like; (9) instructions for how to use fragmented litter produced using the litter box assembly to manage animal waste; (10) instructions for how to dispose of animal waste deposited by an animal in the litter box assembly; and (11) instructions for how to dispose of fragmented animal litter produced using the litter box assembly.

When the kits comprise a virtual package, the kits are limited to instructions in a virtual environment in combination with one or more physical kit components. The kits may contain the kit components in any of various combinations. In one embodiment, the kit contains a litter box and a litter fragmenting device. In another, the kit contains a litter box, a litter fragmenting device, and a hopper. In another, the kit contains a litter box, a litter fragmenting device, a hopper, and a package of litter. In a further, the kit contains a litter fragmenting device and a package of litter. Many other such combinations, including combinations including various instructions and litter handling devices, are encompassed within the invention. The kits encompass one or more kit components that are ordered and shipped separately to a consumer, e.g., an order on the internet or by phone for a litter box and a litter fragmenting device wherein the two articles are shipped from separate locations to the consumer's address. In all embodiments, the litter box, litter fragmenting device, and hopper may be attachable and detachable so that they can be used to produce a litter box assembly of the invention.

In a further aspect, the invention provides a means for communicating information about or instructions for one or more of (1) assembling two or more of a litter box, a litter fragmenting device, and a litter hopper to produce a litter box assembly of the invention; (2) using a litter box assembly of the invention to produce a fragmented litter, particularly a fragmented litter made from an extruded animal litter that has an increased absorption rate when fragmented; (3) using fragmented litter produced using the litter box assembly of the invention to manage animal waste, particularly fragmented litter made from extruded litter as contemplated herein; (4) using the kits of the invention to produce a litter box assembly of the invention; (5) using the kits of the invention to produce a fragmented litter, particularly a fragmented litter made from an extruded animal litter that has an increased absorption rate when fragmented; (6) obtaining technical assistance to produce or use the litter box assembly of the invention; and (7) disposing of fragmented animal litter produced using the litter box assembly of the invention, either used or unused. The means comprises a document, digital storage media, optical storage media, audio presentation, or visual display containing the information or instructions. In certain embodiments, the communication means is a displayed web site, visual display, kiosk, brochure, product label, package insert, advertisement, handout, public announcement, audiotape, videotape, digital streaming, DVD, CD-ROM, computer readable chip, computer readable card, computer readable disk, computer memory, or combination thereof containing such information or instructions. Useful information includes one or more of contact information for consumers to use if they have a question about the invention and its use. The communication means is useful for instructing on the benefits of using the present invention and communicating the approved methods for using the invention for the benefit of the animal using the litter box assembly.

As discussed previously, litter box assembly 10 can be used to generate fragmented animal litter that has improved and superior absorption capabilities as compared to conventional animal litter (e.g., unfragmented animal litter). The resulting fragmented animal litter, for example, can include one or more animal litter particles that have been produced by fragmenting at least one extruded animal litter particle that has a film on the surface of the extruded animal litter particle. Details of the improved properties of such a fragmented animal litter are described in U.S. Provisional Patent Application No. 61/339,262. The improved properties of the fragmented animal litter is based upon the discovery that typical extruded animal litter particles have a "film" on the surface of the particles that adversely affects the absorption properties of the litter, e.g., decreases the absorption rate, and that fragmenting the litter particles to expose the interior of the particles to the external environment increases the absorption rate. This surface film adversely affects the absorption properties of the particles by decreasing the permeability of the particles to liquids such as urine, e.g., liquids are absorbed at a slower rate than they would be if there was no film on the surface of the particles. However, the interior portion of the particles does not have this film. Therefore, the interior of the particles have the ability to absorb liquids at an increased rate compared to that of the surface of the particles.

While not being bound by theory, it is believed that the extrusion process described herein causes the starch to expand thus creating an expanded cellular structure in the litter with cells that are less dense than the clays alone. This decreases the density of the litter without adversely affecting the ability of the material to function as an animal litter. Further, the starch produces a composition that does not break apart to produce dust or clay fines, e.g., the starch produces a skin or "film" on the animal litter that maintains its integrity when handled and therefore does not produce small particles of the inventive animal litter.

While not being bound by theory, it is believed that the heat and friction formed at the surface of the extruded animal litter particles when they contact the extruder equipment changes the surface properties of the particles by forming a "film" at the surface of the particles. Generally, the extruded litter particles have an expanded cellular structure as noted above. Many of the "cells" at the surface of the particles are at least partially sealed or blocked by the changes in cellular structure caused by the heat and friction resulting from contact between the litter composition and the extruder components, i.e., these surface cells have a relatively closed structure compared to cells that do not contact the extruder equipment. Apparently, the heat and friction at the surface of the particles alters the physical properties of the cells at the surface, i.e., the cells at the surface not as permeable as the more typical cells in the interior of the particles. These less permeable cells are responsible for the "film" that affects permeability and absorption rates.

Fragmenting (e.g., by cutting, crushing, breaking, or otherwise) a litter particle into two or more particles using the litter box assemblies in embodiments of the invention creates a larger surface area for absorption when compared to the original litter particle alone. To illustrate, an ideal animal litter particle is a cylinder. The cylinder has a surface area of $2\pi R^2 + 2\pi RH$ where $\pi$ is 3.14, R is the radius of the cylinder, and H is the height or length of the cylinder. An idealized single cut of the particle produces two cylindrical litter particles. The total surface area of the two particles is always greater than the surface of the original particle. How much the surface area increases depends on the size of the particle, i.e., the radius and the height. One would expect the absorption rate of the two litter particles formed by fragmenting a single litter particle to be directly proportional to the increase in surface area obtained by fragmenting the original particle into two particles. However, the fragmented litter particles have an absorption rate that exceeds the absorption rate expected based on the increase in surface area caused by the fragmentation. The theory is that the surface area created by the fragmentation does not have the film characteristic of the surface area of the unfragmented extruded litter particle. The surface area created by the fragmentation can therefore absorb liquids at a relatively increased rate.

In an embodiment, hopper 50 includes one or more types of animal litter 60. Animal litter 60 can be in the form of whole individual pieces or pellets of specific formulation of animal litter. In an embodiment, animal litter 60 is an extruded animal litter. For example, the animal litter can include an extruded mixture including from about 10 to about 90% of or more clays and from about 90 to about 10% of one or more starches. Details of an extruded animal litter are described in U.S. Provisional Patent Application No. 61/337,019. The extruded animal litter described therein has several surprising characteristics. The animal litter has a relatively low density when compared to conventional clay-based animal litters, i.e., the litters weigh less per unit volume and are therefore easier to handle and transport. Other advantages of the animal litter include having the flexibility to modify shapes, maximize animal acceptance, improve odor control, lessen scattering and tracking, and maximize caregiver appeal.

Additionally, the extrusion process can produce animal litters that have a "film" on the surface of the litters as previously discussed. In conventional extrusion processes for food and similar products, the surface of the product is porous. In the extruded animal litters, the use of clay fills the pores at the surface and creates the film. This film helps prevent the clay in the litter from forming dust particles that contaminate the environment, particularly when tracked into the environment by an animal using the litter. While not bound by theory, the film is believed to be formed when the clay and starch gelatinize and produce a film of clay and starch on the surface of the litter. Further, the use of clay creates a greater honeycomb structure in the interior of the animal litters. This structure helps reduce the density of the litter composition.

In addition, the use of starch in the animal litters makes the litters more biodegradable than conventional clay-based litter compositions, i.e., the starch in the litters will be degraded in the environment. In various embodiments, the starches include amylose and/or amylopectin. The starches can be purified starches such as corn starch or starches derived from natural sources such as wheat flour, sorghum, bananas, potatoes, rice, corn, or wheat. In various embodiments, when starch is derived from a natural source such as corn, the starch source is simply mixed with the clay and processed according to the methods described in U.S. Provisional Patent Application No. 61/337,019. In preferred embodiments, the starch source is ground to a fine particle size before mixing with the clay, e.g., particle sizes of from about 10 to about 150 mesh. When starch is derived from a natural source, the amount of starch in the source must be taken into account when calculating the amount of the source to include in the formulation for the litter. Each such starch source has a chemical balance of starch, protein, fat, and fiber. While purified starch may be used, it is more cost effective to use native grains. In this situation, the formula used to make the animal litter can be adjusted to obtain the desired amount of starch using methods known to skilled artisans.

The clays useful in the animal litters are any clays useful for forming animal litters, particularly in the extrusion methods described herein. In various embodiments, the clays are non-swelling clays, swelling clays, or combinations thereof. The clays can be clays that are obtained directly by mining natural clay deposits, synthetic clays, or clays that are derived from the agglomeration of clay particles, e.g., clay particles (e.g., clay fines) produced by litter or other manufacturing processes that involve the use of clays.

The animal litters used in conjunction with the litter box assemblies described herein can have a density of from about 10 to about 40 pounds per cubic foot (lbs/ft$^3$), (169 to 641 kilograms per cubic meter (kg/m$^3$)), preferably from about 16 to about 36 lbs/ft$^3$, (256 to 577 kg/m$^3$), most preferably from about 20 to about 32 lbs/ft$^3$, (320 to 513 kg/m$^3$). Typical conventional clay-based animal litters have a density of from about 40 to about 60 lbs/ft$^3$, (641 to 961 kg/m$^3$). Therefore, the animal litters have a density that is less than that of conventional clay-based animal litters. The extruded litters are therefore less expensive for manufacturers and consumers to handle and transport. Further, the litters are more biodegradable because of the presence of the starch. In addition, the extruded litters have similar or superior properties when compared to conventional litters, e.g., the extruded litters absorb moisture and control odors similar to conventional clay-based litters. The decrease in density reduces the amount of total mass that must be transported and disposed in landfills.

In additional embodiments, the animal litters further include one or more lubricants, one or more plasticizers, and one or more binders in any combinations. The lubricants, plasticizers, and binders can be added to the clay and starch mixture in amounts that achieve the benefits described herein. Generally, the lubricants, plasticizers, and binders are added individually. In one embodiment, the lubricants, plasticizers, and binders are mixed before being added to the mixture. In another, the lubricants and plasticizers are mixed before addition and the binders are added individually.

The animal litters may contain additional performance enhancing materials that improve the functional properties of the compositions. Many such materials are known in the art. For example, US20050005869 and its related patent applications disclose many such performance enhancing materials and methods for using the materials with absorbent compositions, e.g., antimicrobials, odor reducing materials, fragrances, health indicating materials, color altering agents, dust reducing agents, nonstick release agents, superabsorbent materials, cyclodextrins, zeolites, activated carbons, pH altering agents, salt forming materials, ricinoleates, and mixtures thereof. U.S. Pat. No. 7,533,630 discloses functional agents useful detecting presence of sugar in urine and detecting diabetes.

In one embodiment, the litters contain activated carbon. Activated carbon is known to be a good absorber of organic materials that may be responsible for malodors. For example, U.S. Pat. No. 5,860,391 discloses absorbents containing activated carbon for odor control. U.S. Pat. No. 6,287,550 discloses compositions for reducing malodors that contain activated carbon. When used, activated carbon is added to the animal litters in amounts of from about 0.01 to about 6%, preferably from about 2 to about 5%, most preferably from about 3 to about 4%.

In another embodiment, the litters contain baking soda. Baking soda is known to be a good absorber of organic materials that may be responsible for malodors. Use if baking soda to control animal waste is known, e.g., U.S. Pat. No. 6,955,136 and U.S. Pat. No. 6,837,181. When used, baking soda is added to the animal litters of the present invention in amounts of from about 0.01 to about 6%, preferably from about 0.05 to about 5%, most preferably from about 2 to about 4%.

In other embodiments, the litters further include a partial or complete coating of one or more swelling clays. Coating the litters with swelling clays imparts a clumping property to the litters while still retaining most of the advantages of the litters, e.g., a lower density that conventional clay-based litters. The swelling clays are coated onto the litters in amounts that include from about 5 to about 40% of the litter, preferably from about 10 to about 45%, most preferably from about 15 to about 30%. Methods for coating the animal litters and methods for producing clumping animal litters are disclosed in U.S. Pat. No. 6,887,570. In one embodiment, animal litter particles of are placed in a rollermill with one or more swelling (clumping) clays and the particles are mixed with the clays until the particles have a coating of the clays in the required range, preferably about 30%. In one embodiment, the swelling clay is bentonite.

In another aspect, the invention provides methods for making an animal litter, particularly an animal litter that has improved absorption properties. The methods comprise providing a litter box assembly of the invention, inserting animal litter into the litter fragmenting device, and fragmenting the animal litter using the litter fragmenting device. The resulting fragmented litter has properties different from the litter before it was fragmented, e.g., smaller size, increased liquid absorption rates, and the like. Preferably, the animal litter is an extruded animal litter as described herein. The fragmented extruded animal litter has improved absorption rates as described herein.

In another aspect, the invention provides animal litters made using the methods described herein.

In another aspect, the invention provides methods for managing animal waste. The methods comprise providing a litter box assembly of the invention, inserting animal litter into the litter fragmenting device, fragmenting the animal litter using the litter fragmenting device, and contacting animal waste with the fragmented animal litter.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

What is claimed is:

1. A litter box assembly comprising:
a litter box;
a litter fragmenting device attached to the litter box; and
a fragmented litter fed into in the litter box via the litter fragmenting device, the fragmented litter comprising an extruded particle having an outer surface and an interior region, the interior region comprising an expanded cellular structure including one or more clays and one or more starches; a film on at least a portion of the outer surface; and a fragmented surface region that is substantially free of the film and exposes the expanded cellular structure.

2. The litter box assembly of claim 1 wherein the litter fragmenting device is detachable from the litter box.

3. The litter box assembly of claim 1 wherein the litter fragmenting device includes a feeding chute for feeding the fragmented litter into the litter box.

4. The litter box assembly of claim 1 further comprising a hopper attached to the litter fragmenting device.

5. The litter box assembly of claim 4 wherein the hopper is detachable from the litter fragmenting device.

6. The litter box assembly of claim 4 further comprising an unfragmented, extruded animal litter in the hopper.

7. The litter box assembly of claim 6 wherein the unfragmented, extruded animal litter has an increased absorption rate after it is fragmented.

8. The litter box assembly of claim 1 wherein the litter fragmenting device comprises a plurality of rollers.

9. The litter box assembly of claim 1 wherein the litter fragmenting device includes one or more fragmenters selected from the group consisting of blades, hammers, mills, and combinations thereof.

10. The litter box assembly of claim 1 wherein the litter fragmenting device is powered using a power source selected from the group consisting of a hand crank, a battery, electricity, solar energy, and combinations thereof.

11. The litter box assembly of claim 1 wherein the litter fragmenting device includes a fragment adjuster to control the animal litter particle size of the fragmented litter produced by the litter fragmenting device and fed into the litter box.

12. A method for making an animal litter comprising
inserting an unfragmented, extruded animal litter into a litter fragmenting device attached to a litter box,
fragmenting the animal litter using the litter fragmenting device; and
feeding the fragmented animal litter into the litter box via the litter fragmenting device, the fragmented litter comprising an extruded particle having an outer surface and an interior region, the interior region comprising an expanded cellular structure including one or more clays and one or more starches; a film on at least a portion of the outer surface; and a fragmented surface region that is substantially free of the film and exposes the expanded cellular structure.

13. The method of claim 12 wherein the unfragmented, extruded animal litter has an increased absorption rate after it is fragmented.

14. A method for managing animal waste comprising
inserting an unfragmented, extruded animal litter into a litter fragmenting device,
fragmenting the animal litter using the litter fragmenting device,
feeding the fragmented animal litter into the litter box via the litter fragmenting device, the fragmented litter comprising an extruded particle having an outer surface and an interior region, the interior region comprising an expanded cellular structure including one or more clays and one or more starches; a film on at least a portion of the outer surface; and a fragmented surface region that is substantially free of the film and exposes the expanded cellular structure, and
contacting animal waste with the fragmented animal litter.

* * * * *